United States Patent
Lemson et al.

(10) Patent No.: US 9,148,203 B2
(45) Date of Patent: Sep. 29, 2015

(54) SOFTWARE CONFIGURABLE DISTRIBUTED ANTENNA SYSTEM AND METHOD FOR REDUCING UPLINK NOISE

(71) Applicant: Dali Systems Co. Ltd., George Town, Grand Cayman (KY)

(72) Inventors: Paul Lemson, Woodinville, WA (US); Shawn Patrick Stapleton, Burnaby (CA); Sasa Trajkovic, Burnaby (CA)

(73) Assignee: DALI SYSTEMS CO., LTD., George Town Grand Cayman (KY)

( * ) Notice: Subject to any disclaimer, the term of this patent is extended or adjusted under 35 U.S.C. 154(b) by 0 days.

(21) Appl. No.: 14/333,277

(22) Filed: Jul. 16, 2014

(65) Prior Publication Data

US 2015/0078471 A1 Mar. 19, 2015

Related U.S. Application Data

(63) Continuation of application No. 13/602,818, filed on Sep. 4, 2012, now Pat. No. 8,817,848.

(60) Provisional application No. 61/530,888, filed on Sep. 2, 2011.

(51) Int. Cl.
*H04B 3/36* (2006.01)
*H04B 7/17* (2006.01)
(Continued)

(52) U.S. Cl.
CPC ............... *H04B 7/04* (2013.01); *H04B 7/022* (2013.01); *H04W 88/085* (2013.01)

(58) Field of Classification Search
CPC ........ H04B 3/36; H04B 7/15542; H04B 7/17; H04B 10/25753; H04B 10/1125; H04B 10/25752; H04B 10/25759; H04B 7/2606; H04B 7/15557; H04B 1/56; H04B 7/155; H04B 7/212; H04B 7/2123; H04B 7/18582; H04B 7/2643; H04B 7/2656; H04B 7/2041; H04B 7/04; H04B 7/022; H04L 25/20; H04L 12/44; H04L 12/46; H04L 25/242; H04L 7/027; H04L 25/24; H04L 7/033; H04L 12/422; H04L 25/0266; H04L 25/06; H04L 5/023; H04L 25/0272; H04L 25/0292; H04L 25/028; H04L 25/08; H04L 7/0008; H04W 88/085; H04W 16/26
USPC ................. 375/211, 214, 215, 220, 222, 257; 398/116; 370/279, 315, 321, 325
See application file for complete search history.

(56) References Cited

U.S. PATENT DOCUMENTS 6,868,254 B2 3/2005 Weissman
7,079,809 B1 7/2006 Scherzer
(Continued)

FOREIGN PATENT DOCUMENTS

CN 103999436 A 8/2014
EP 2 749 123 7/2014
(Continued)

OTHER PUBLICATIONS

Non-Final Office Action for U.S. Appl. No. 13/602,818 mailed on Jan. 14, 2014, 8 pages.
(Continued)

*Primary Examiner* — Phuong Phu
(74) *Attorney, Agent, or Firm* — Kilpatrick Townsend & Stockton LLP

(57) ABSTRACT

A distributed antenna system includes a master unit including a downlink RF input operable to receive an RF input signal from a downlink port of a base station, a first optical port, and a second optical port. The distributed antenna system also includes a first remote unit coupled to the first optical port. The first remote unit comprises a downlink antenna port and a first uplink antenna port and a second remote unit coupled to the second optical port of the master unit. The second remote unit comprises a downlink antenna port and a second uplink antenna port. The master unit is operable to transmit a first RF signal associated with the first RF uplink signal to a first uplink port of the base station and transmit a second RF signal associated with the second RF uplink signal to a second uplink port of the base station.

17 Claims, 14 Drawing Sheets

(51) Int. Cl.
*H04B 17/02* (2006.01)
*H04L 25/20* (2006.01)
*H04L 25/52* (2006.01)
*H04B 7/04* (2006.01)
*H04B 7/02* (2006.01)
*H04W 88/08* (2009.01)

(56) References Cited

U.S. PATENT DOCUMENTS

| | | |
|---|---|---|
| 8,682,338 B2 | 3/2014 | Lemson et al. |
| 8,737,300 B2 | 5/2014 | Stapleton et al. |
| 8,817,848 B2 | 8/2014 | Lemson et al. |
| 8,848,766 B2 | 9/2014 | Lemson et al. |
| 2002/0114038 A1 | 8/2002 | Arnon et al. |
| 2002/0191565 A1 | 12/2002 | Mani et al. |
| 2006/0182072 A1 | 8/2006 | Ransome et al. |
| 2010/0271957 A1 | 10/2010 | Stapleton et al. |
| 2011/0028084 A1 | 2/2011 | Wiatrowski et al. |
| 2011/0135308 A1* | 6/2011 | Tarlazzi et al. ............... 398/79 |
| 2011/0201368 A1 | 8/2011 | Faccin et al. |

FOREIGN PATENT DOCUMENTS

| | | |
|---|---|---|
| WO | 2004/054290 A1 | 6/2004 |
| WO | 2010/091004 A1 | 8/2010 |
| WO | WO 2013/033715 A2 | 3/2013 |

OTHER PUBLICATIONS

Notice of Allowance for U.S. Appl. No. 13/602,818 mailed on Apr. 15, 2014, 7 pages.
Supplemental Partial European Search Report of Jun. 1, 2015 for European Patent Application No. 12827424.8, 5 pages.
Office Action of Aug. 4, 2015 for Chinese Patent Application No. 201280042828.2, 11 pages.

* cited by examiner

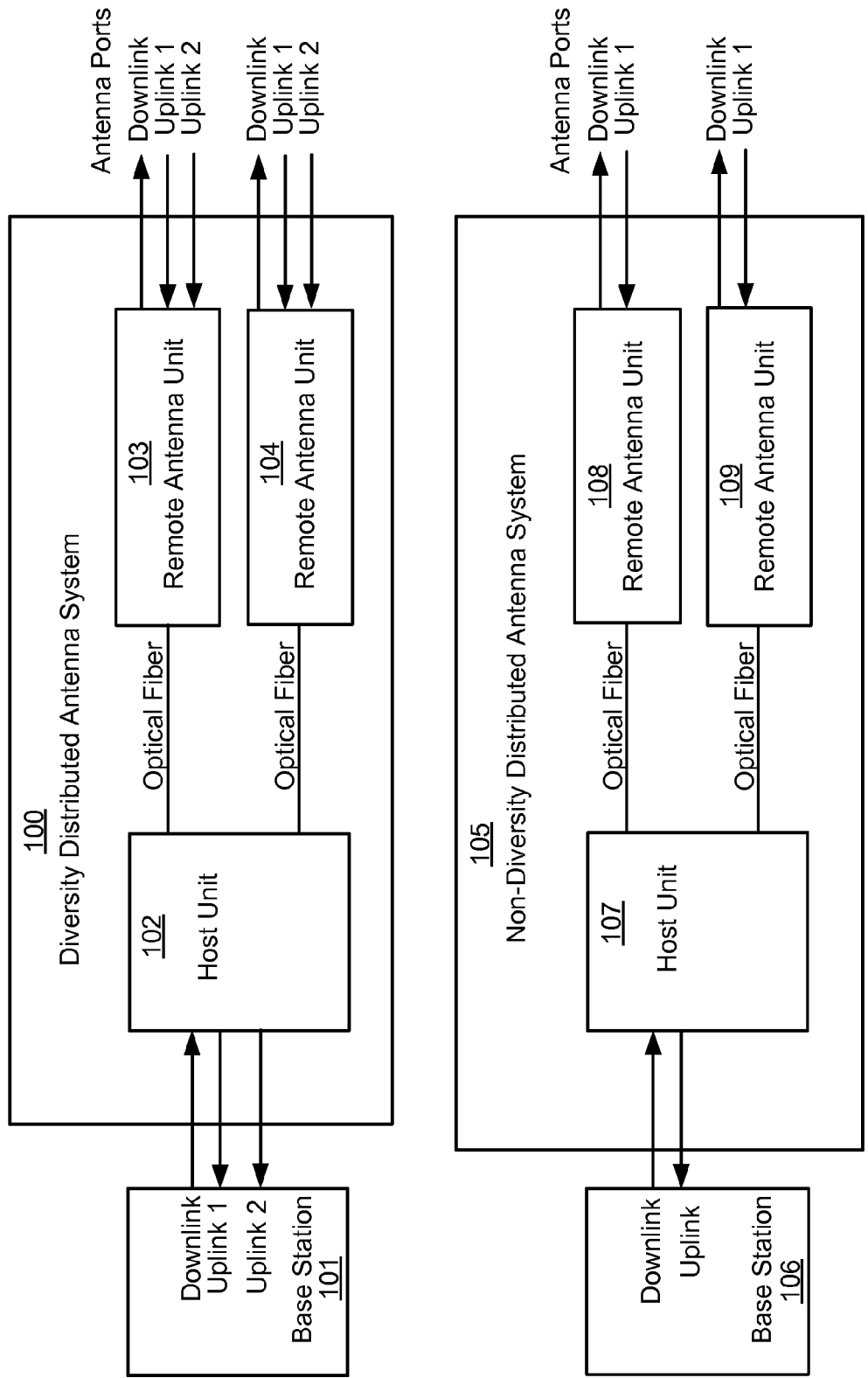
Figure 1: Distributed Antenna Systems [PRIOR ART]

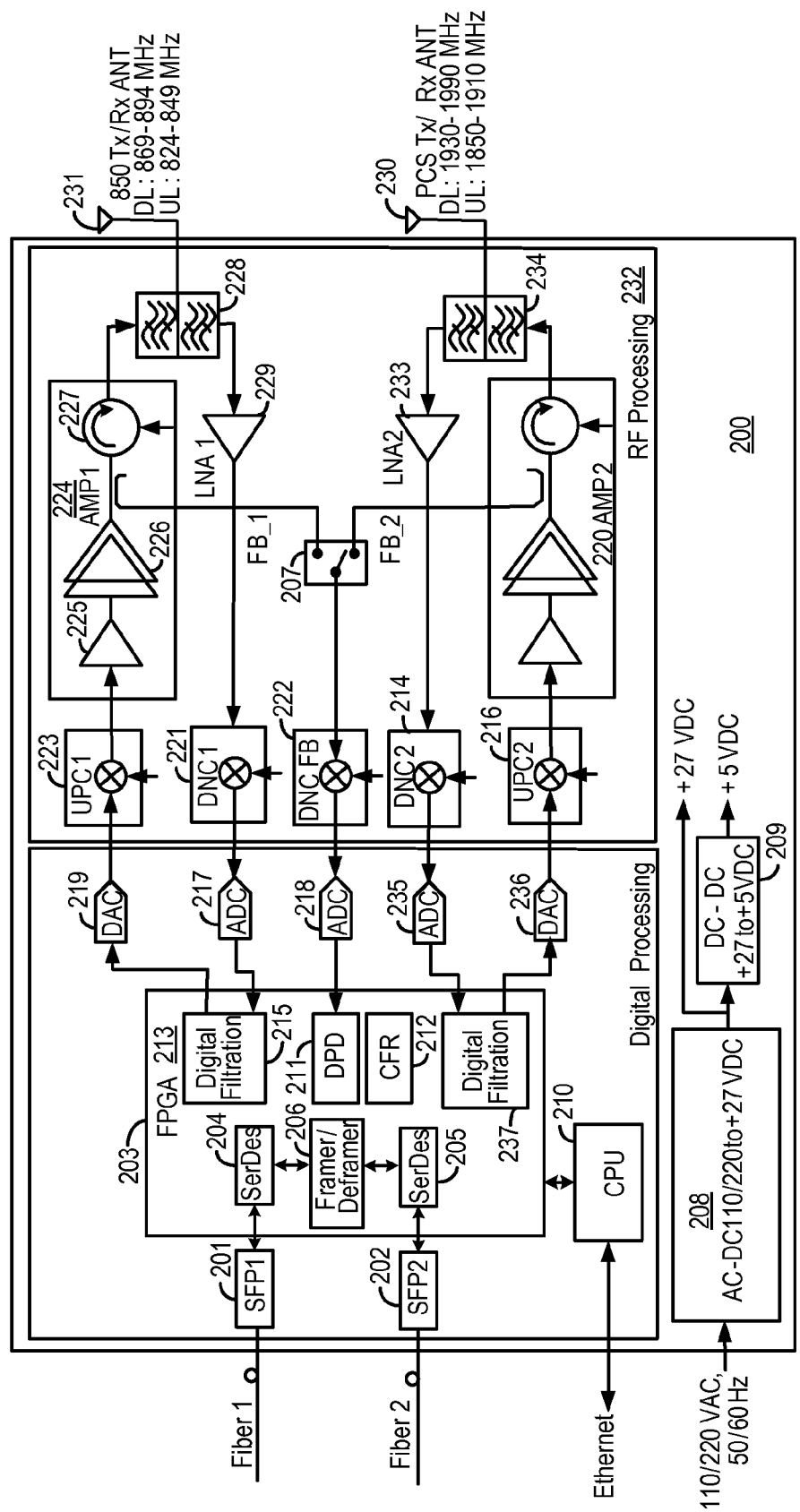
Figure 2: Dual-band Remote Radio Head Unit (RRU)

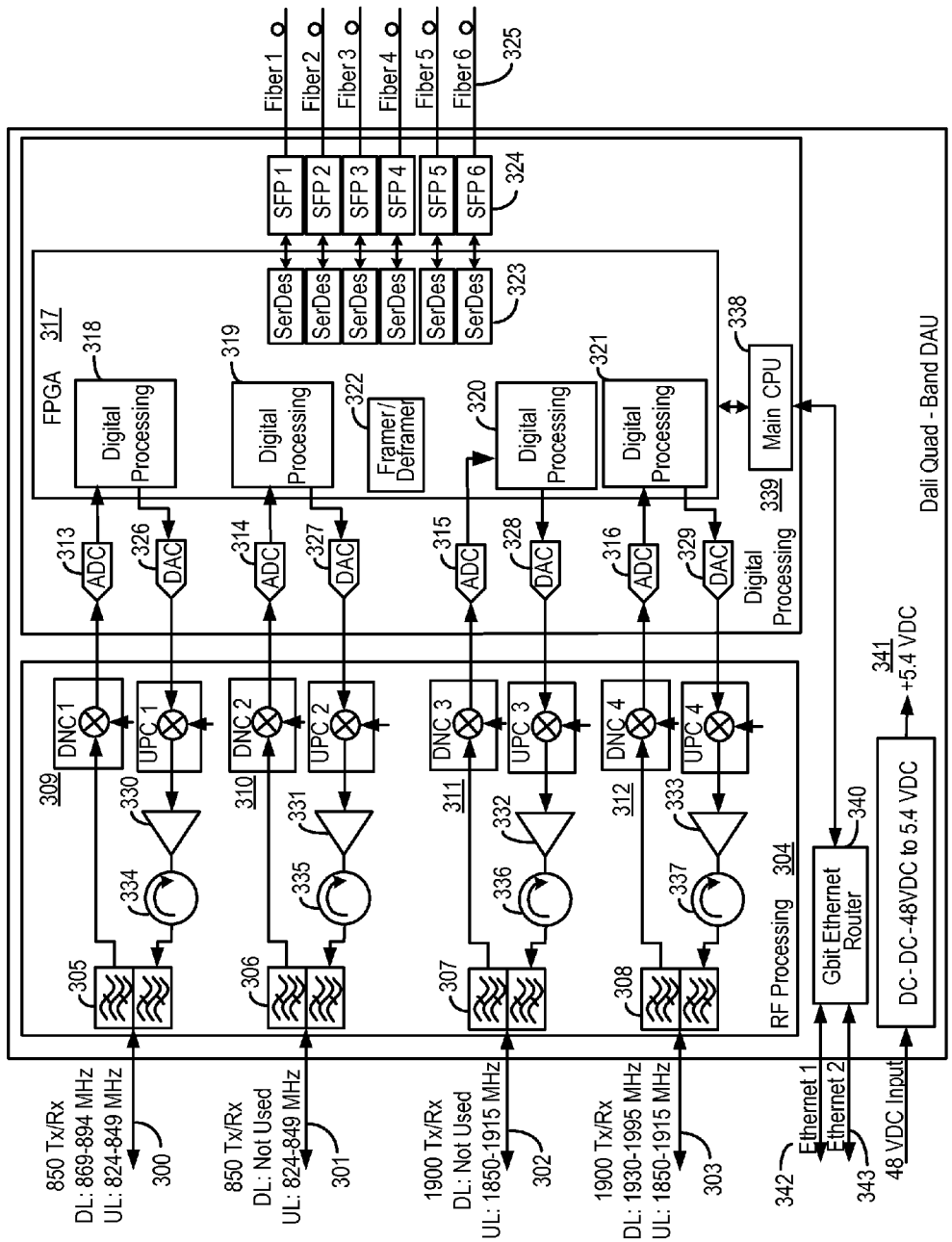
Figure 3: Digital Access Unit (DAU)

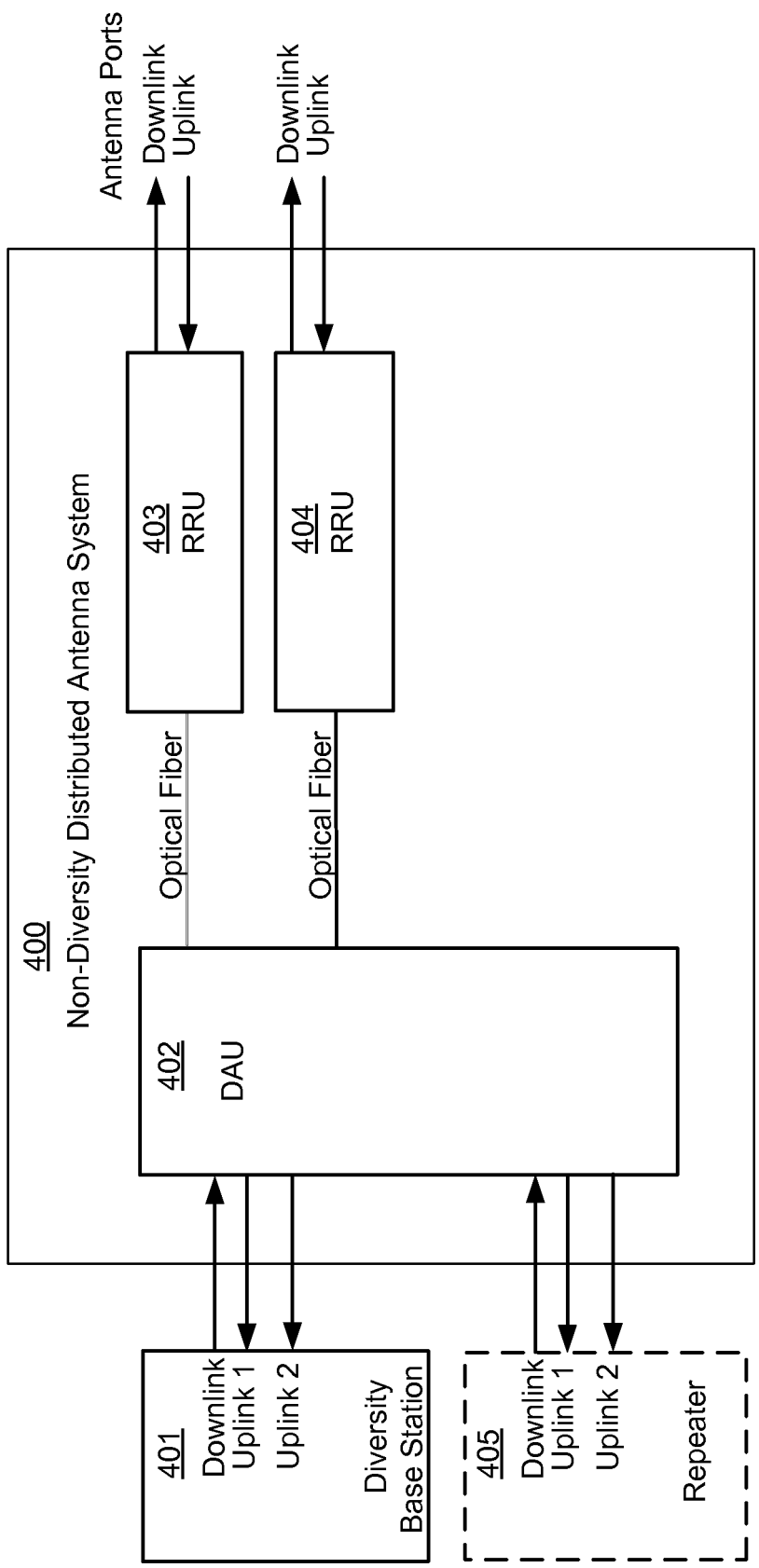
Figure 4: Non-Diversity Distributed Antenna System

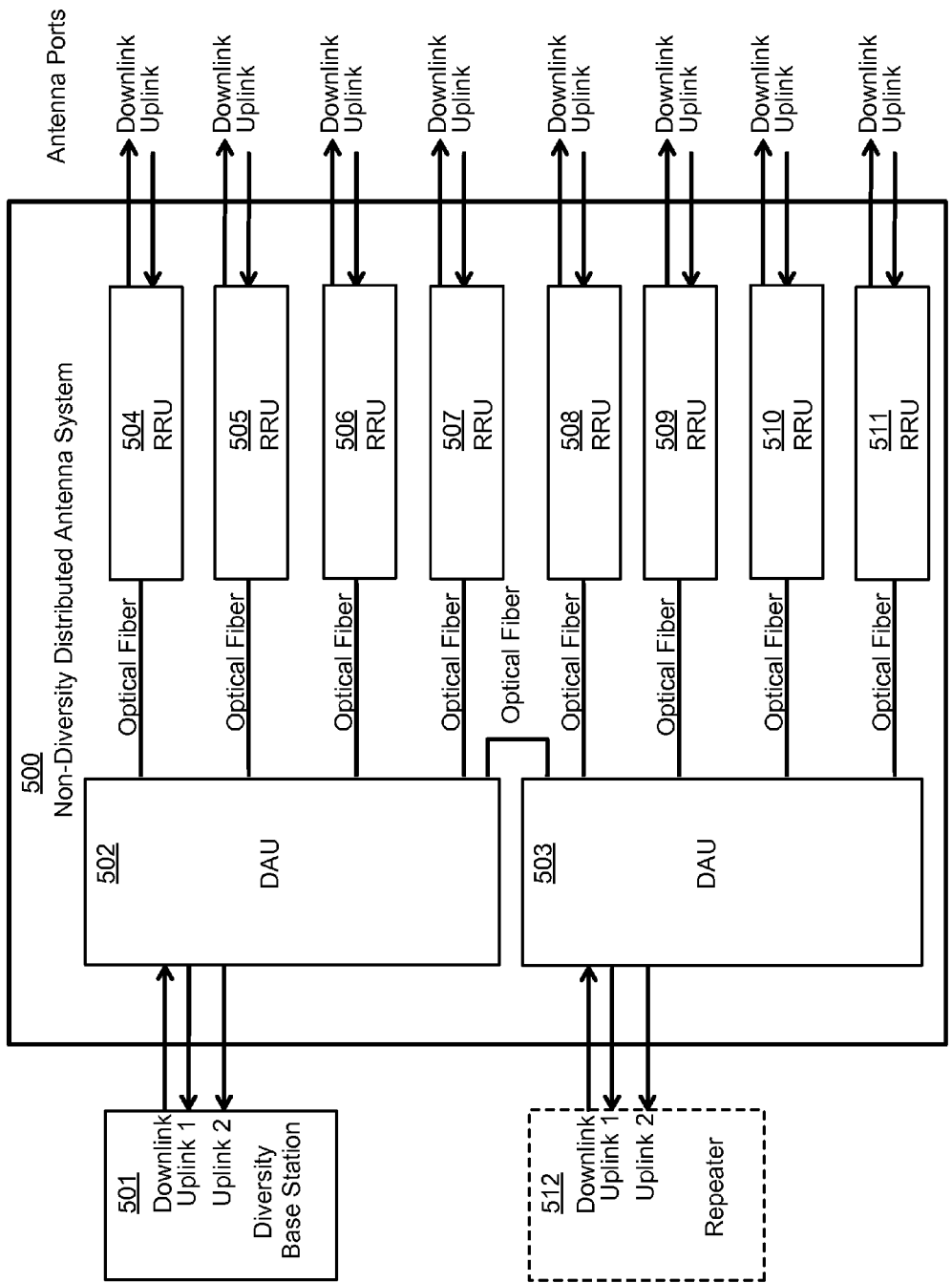

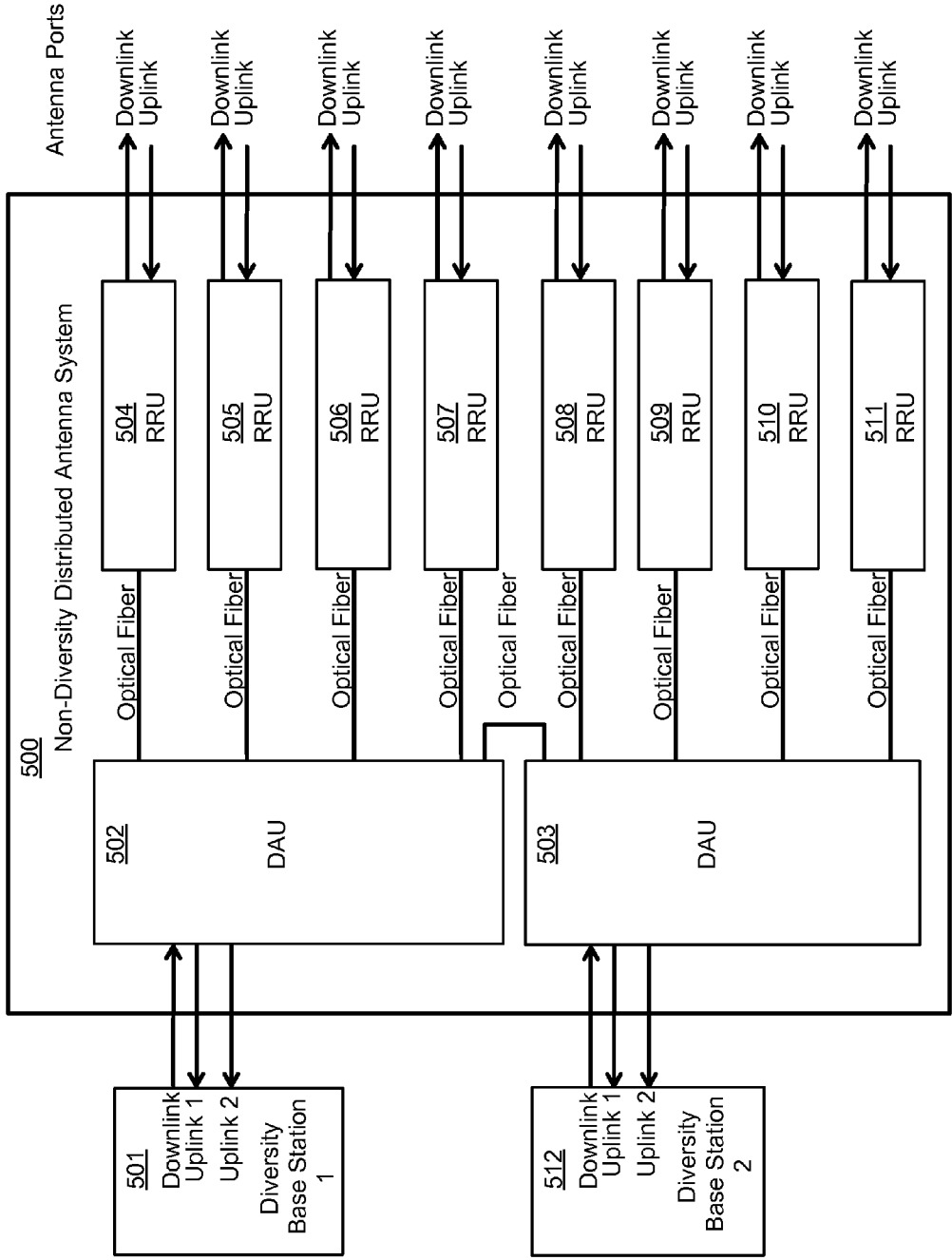
Figure 5A: Non-Diversity Distributed Antenna System with 2 Base Stations

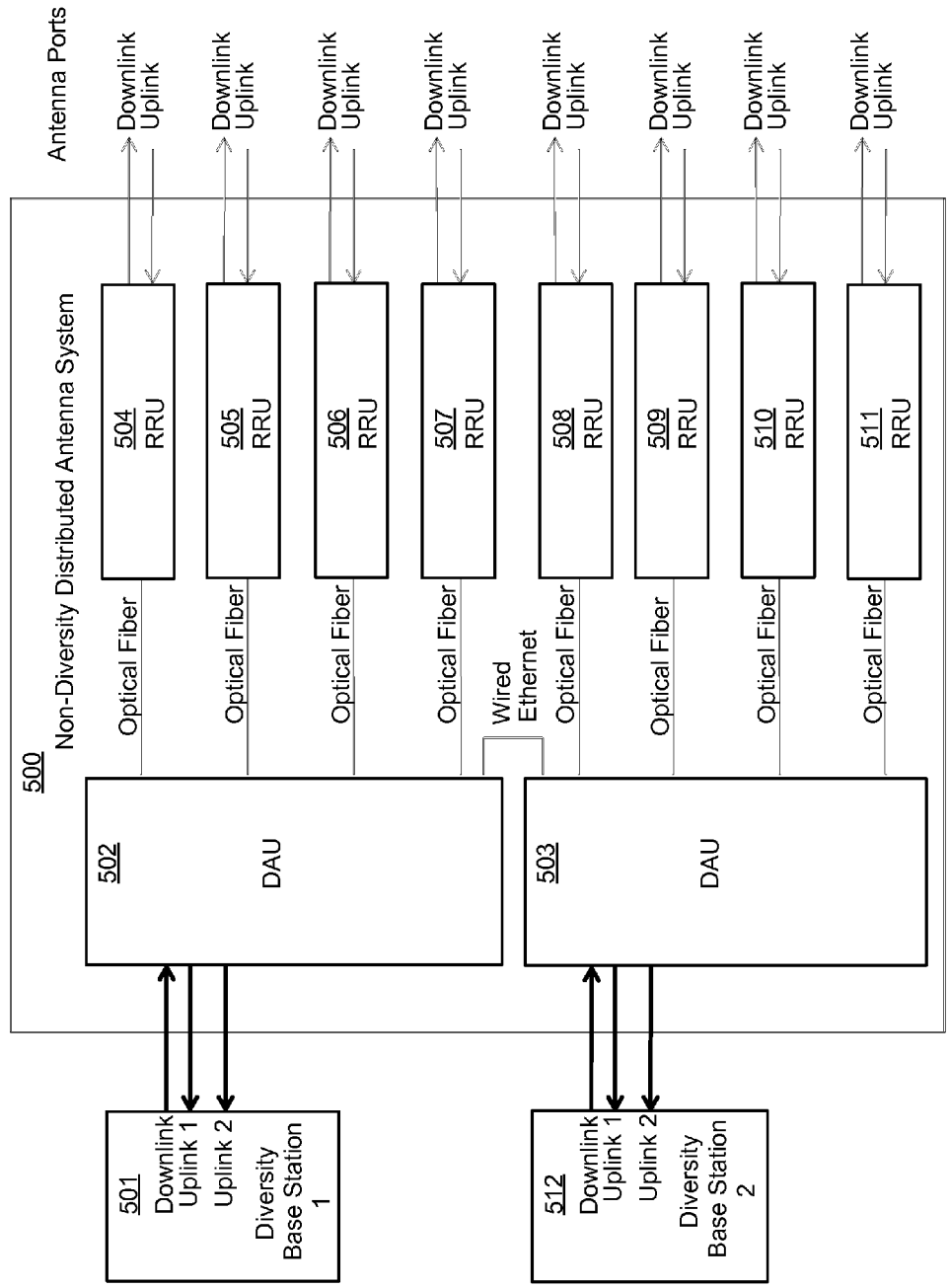
Figure 5B: Non-Diversity Distributed Antenna System with Wired Ethernet Interconnection

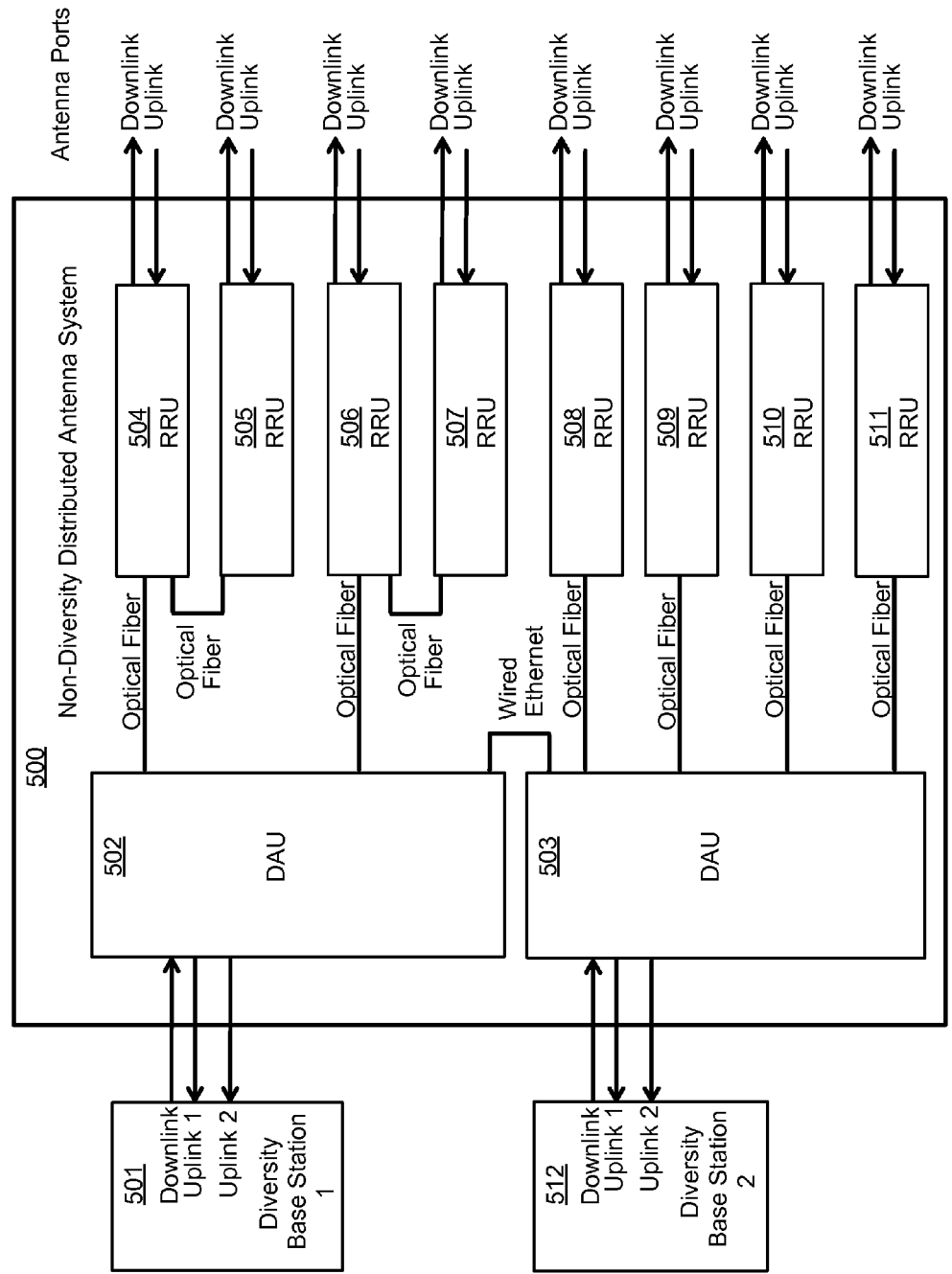

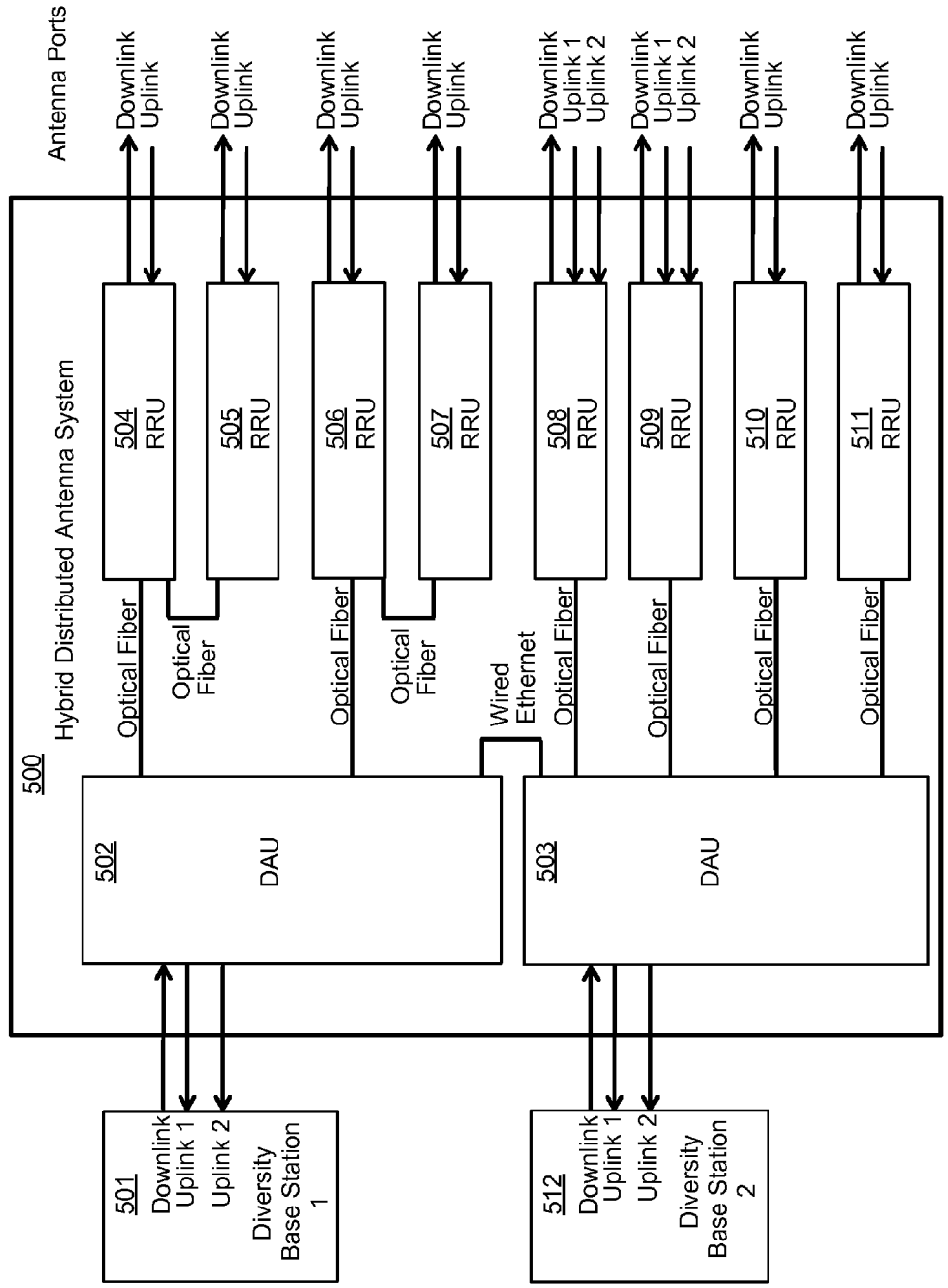
Figure 5D: Combined Non-Diversity and Diversity Distributed Antenna System

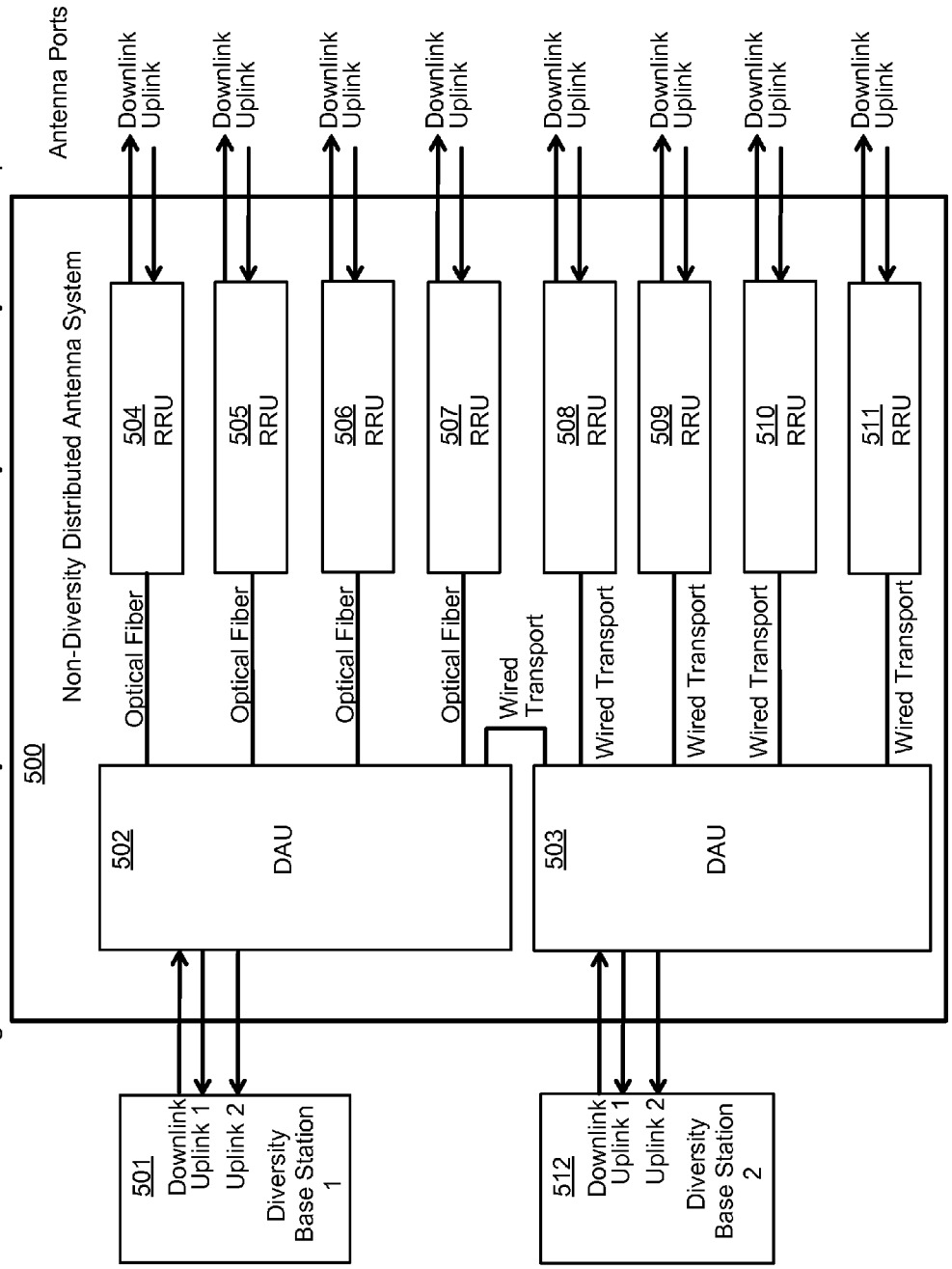

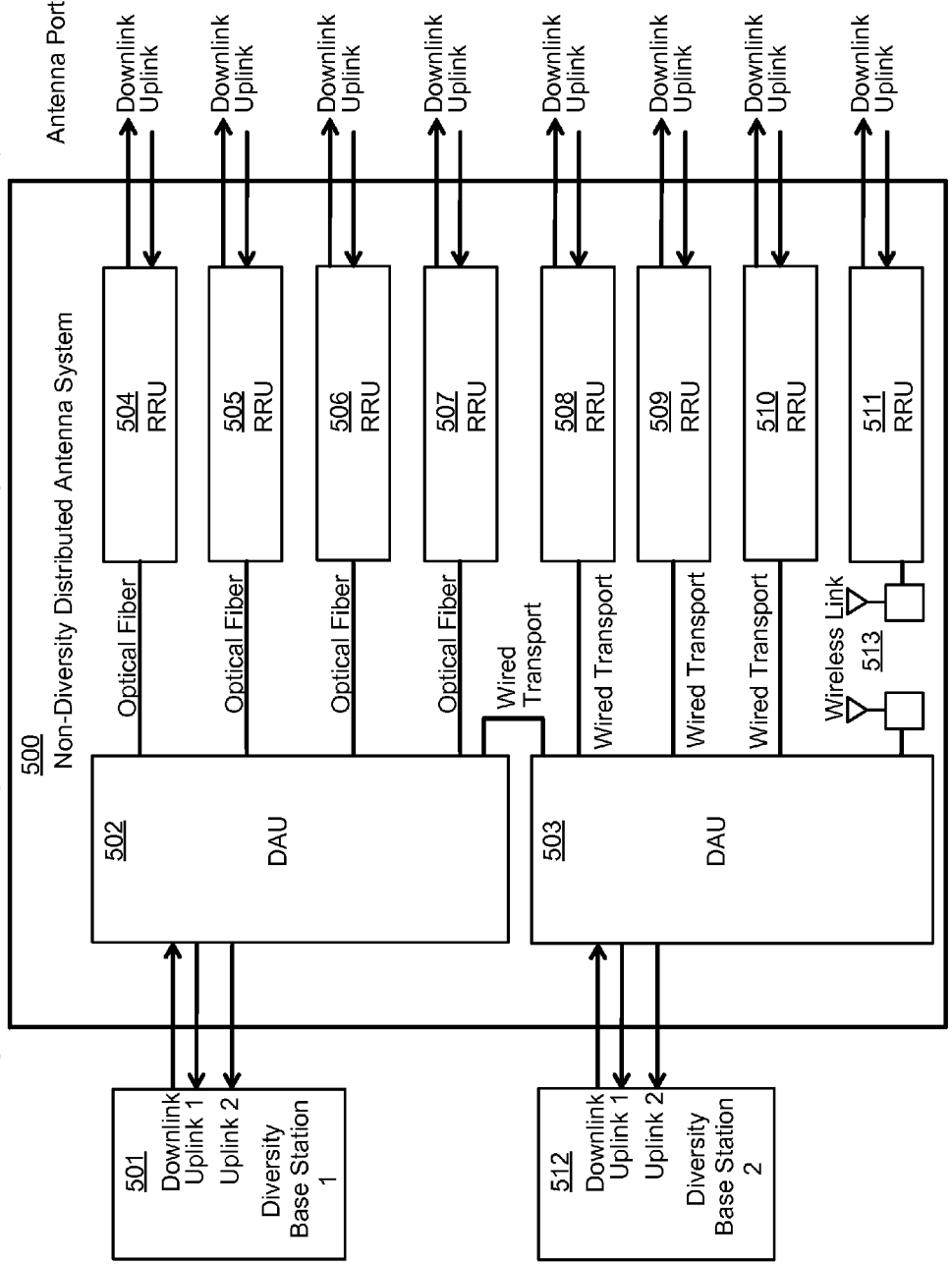

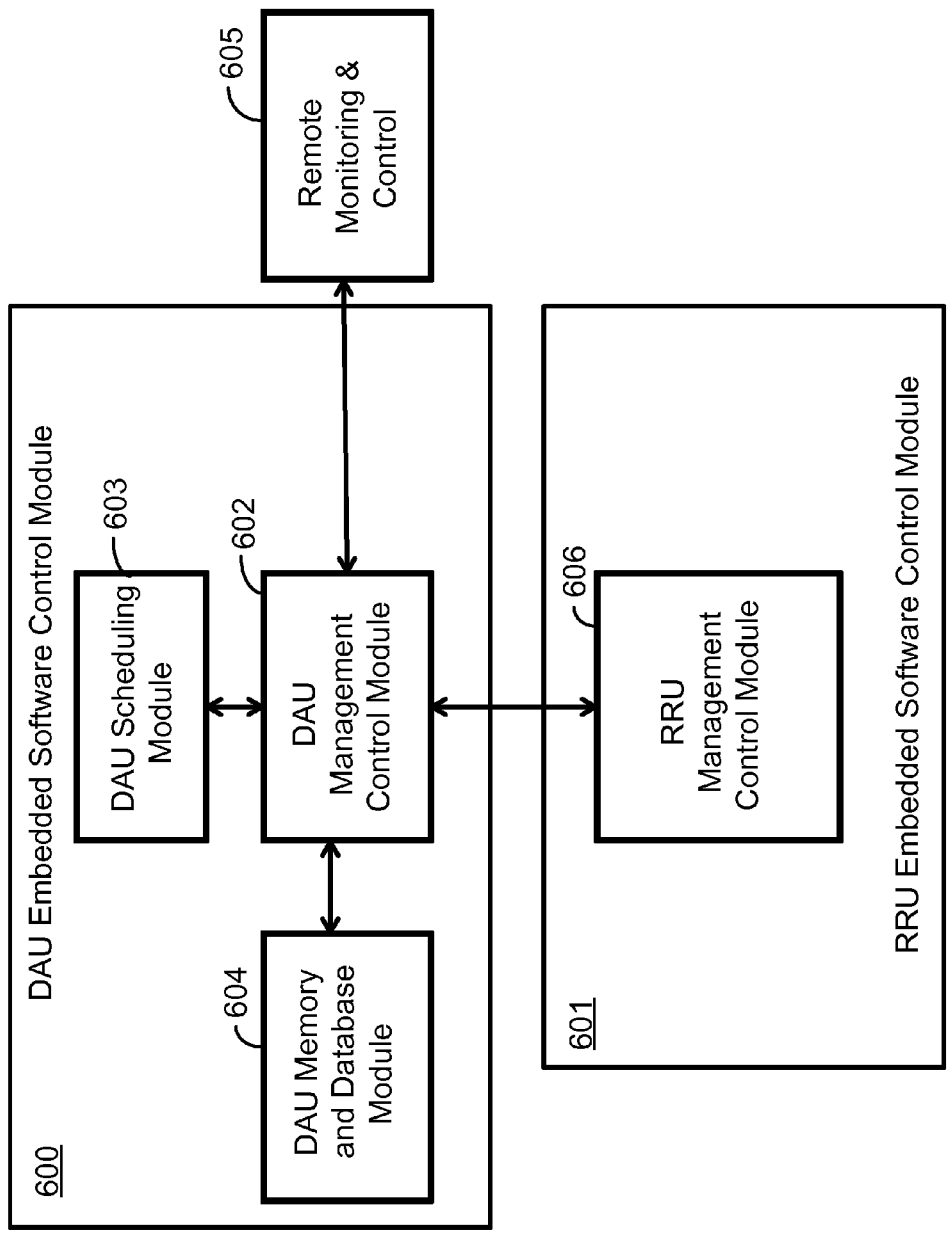
Figure 6: Embedded Software Control Modules

Figure 7: GUI Setup Screen for Reduced Uplink Noise 700

Dali WIRELESS

DAU
DRU1
DRU2
DRU3
DRU4

DAU Configuration

DAU Name/Label: Commerce_Courjrt_2-DAU-S-Q  707

| | Frequency | Interface Type | BTS Sector Selection | Interface Setup | UL simulcast signals configuration [%] |
|---|---|---|---|---|---|
| Band 1: | PCS | S | AT&T-PCS-S1 ∨ | ● Tx  ● Rx  ○ RxD | 55 |
| Band 2: | PCS | S | AT&T-PCS-S1 ∨ | ○ Tx  ○ Rx  ● RxD | 45 |
| Band 3: | AWS | S | Verizon-AWS-S2 ∨ | ● Tx  ● Rx  ○ RxD | 50 |
| Band 4: | AWS | S | Verizon-AWS-S2 ∨ | ○ Tx  ○ Rx  ● RxD | 50 |
| | 701 | 702 | 703 | 704 | 706 |

Set  705

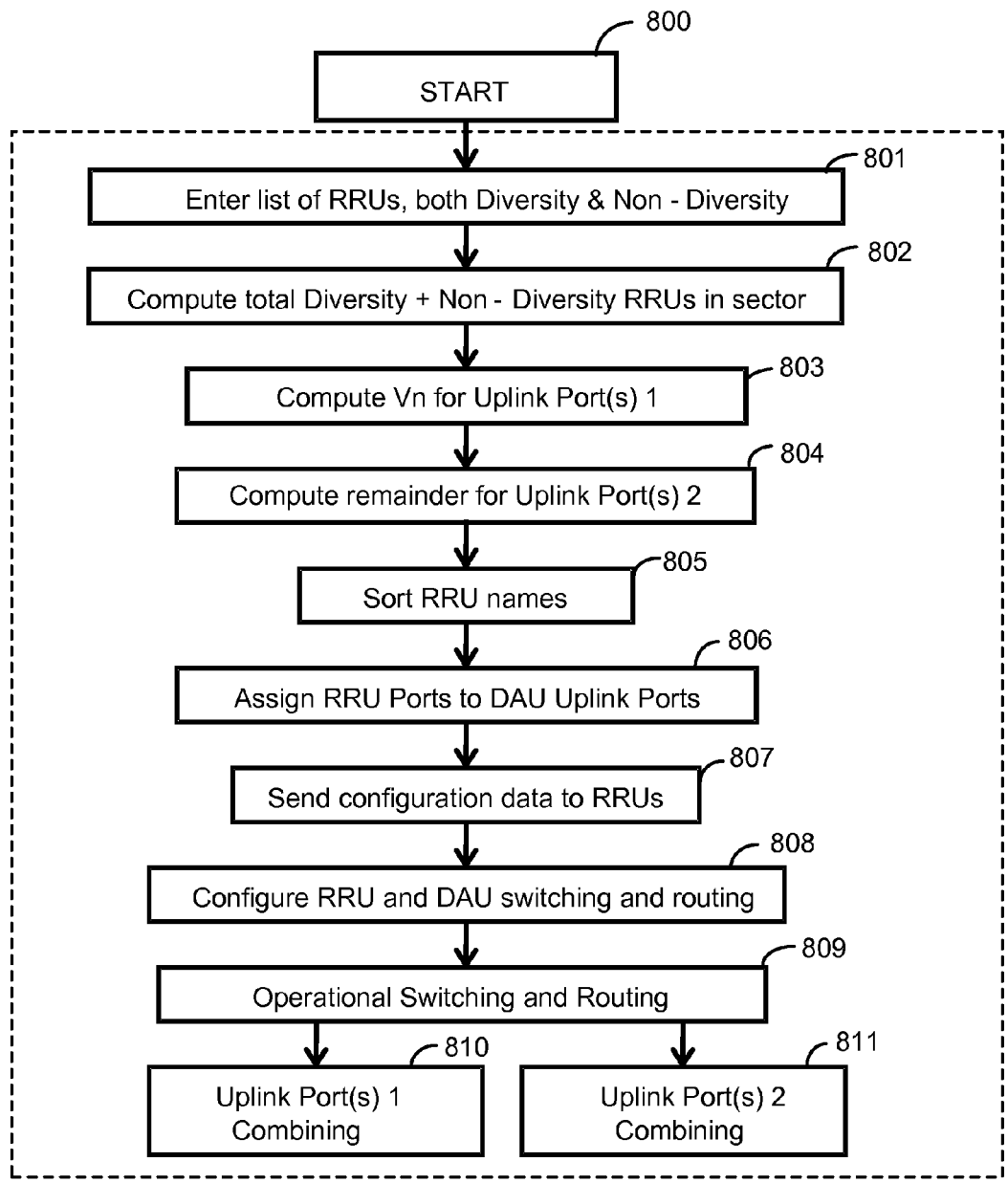
Figure 8: RRU Assignment Process Flow Diagram

SOFTWARE CONFIGURABLE DISTRIBUTED ANTENNA SYSTEM AND METHOD FOR REDUCING UPLINK NOISE

CROSS-REFERENCES TO RELATED APPLICATIONS

This application is a continuation of U.S. patent application Ser. No. 13/602,818, filed Sep. 4, 2012; which claims priority to U.S. Provisional Patent Application No. 61/530,888, filed on Sep. 2, 2011. The disclosures of each are hereby incorporated by reference in their entirety for all purposes.

BACKGROUND OF THE INVENTION

Wireless and mobile network operators face the continuing challenge of building networks that effectively manage high data-traffic growth rates. Wireless and mobile technology standards are evolving towards higher bandwidth requirements for both peak rates and cell throughput growth.

Conventional radio base stations employed in wireless networks which utilize various 2G, 3G and 4G radio technologies (such as CDMA, 1XEV-DO, WCDMA, WiMAX-SISO, LTE-SISO, etc.) routinely include an Uplink Diversity feature. Wireless base stations have been equipped for Uplink Diversity for more than 20 years.

When a base station includes this feature, the system performance may be enhanced by employing two diversity antennas for the uplink receive function. Two receive antennas when deployed in conjunction with a suitable signal combining means in the base station can help mitigate multipath radio propagation effects. The performance enhancement obtained with two receive antennas (compared to the system performance with only one uplink receive antenna) can range from 3 to 10 dB or more (when applied to the system link budget) under various propagation conditions and for various antenna types. The impacts of uplink diversity may also include reducing the mobile transmit power and thereby increasing the mobile's battery service period as well as helping reduce intra-system and inter-system interference. The base station's uplink diversity feature employing diversity antennas can be quite advantageous, therefore most wireless network operators require 2G, 3G and 4G base stations they purchase and deploy to have an uplink diversity capability. Base stations equipped for uplink diversity have two separate receive antenna ports.

Some base stations combine the transmit and receive functions for one of the antenna ports by providing the downlink transmit function and main uplink receive antenna function on the same antenna port. The second antenna port is assigned to the diversity receive antenna. Such base stations have a total of two antenna ports per sector.

FIG. 1 shows two example architectures of a conventional DAS deployment, one where the remote antenna units are configured for non-diversity and a second one where the remote antenna units are configured for a diversity implementation. The host unit is connected to the remote antenna unit by optical fiber. For the diversity implementation, two separate uplink inputs are shown at the remote antenna unit and two uplink ports are shown at the base station. For the non-diversity implementation, only one uplink input is shown at the remote antenna unit and one uplink port is shown at the base station. Despite the progress made in communications systems, there is a need in the art for improved methods and systems related to communications technology.

SUMMARY OF THE INVENTION

The present invention relates generally to communications systems. More specifically, the present invention relates to a high performance, cost-effective, dynamically reconfigurable DAS system architecture that provides an especially low uplink noise value given the total quantity of remote antenna units included in the system. Merely by way of example, the invention has been applied to wireless mobile telecommunications systems. The methods and techniques can be applied to a variety of communications systems including wireless LAN systems, satellite systems, public safety communications systems, and the like.

According to an embodiment of the present invention, a distributed antenna system is provided. The distributed antenna system includes a master unit including a downlink RF input operable to receive an RF input signal from a downlink port of a base station, a first optical port, and a second optical port. The distributed antenna system also includes a first remote unit coupled to the first optical port of the master unit. The first remote unit comprises a downlink antenna port and a first uplink antenna port operable to receive a first RF uplink signal. The distributed antenna system further includes a second remote unit coupled to the second optical port of the master unit. The second remote unit comprises a downlink antenna port and a second uplink antenna port operable to receive a second RF uplink signal. The master unit is operable to transmit a first RF signal associated with the first RF uplink signal to a first uplink port of the base station and transmit a second RF signal associated with the second RF uplink signal to a second uplink port of the base station.

According to another embodiment of the present invention, a distributed antenna system is provided. The distributed antenna system includes a first master unit including a downlink RF input operable to receive an RF input signal from a downlink port of a base station and a first plurality of optical ports. The distributed antenna system also includes a first plurality of remote units, each being coupled to one of the first plurality of optical ports via an optical fiber connection and a second master unit including a second plurality of optical ports. The distributed antenna system further includes a second plurality of remote units, each being coupled to one of the second plurality of optical ports via an optical fiber connection. The second master unit is networked with the first master unit. The first master unit is operable to transmit a first RF signal associated with one or more RF uplink signals received by one or more of the first plurality of remote units to a first uplink port of the base station and transmit a second RF signal associated with one or more RF uplink signals received by one or more of the second plurality of remote units to a second uplink port of the base station.

According to a specific embodiment of the present invention, a method of operating a distributed antenna system is provided. The method includes providing a processor and receiving a list of remote units, each of the remote units having an antenna port. The list of remote units includes a number of non-diversity remote units. The method also includes computing, for a sector, a number of diversity remote units and a number of non-diversity remote units, computing, using the processor, a percentage of the number of non-diversity remote units in the list of remote units, and assigning, for each of the remote units, the antenna port to either a first uplink port of a master unit or a second uplink port of the master unit. The method further includes transmitting the assignments to the remote units, receiving a first RF uplink signal at an antenna port of a first remote unit, receiving a second RF uplink signal at an antenna port of a second remote unit, transmitting an RF signal associated with the first RF uplink signal to the first uplink port of the master unit, and transmitting a second RF signal associated with the second RF uplink signal to the second uplink port of the master unit.

Embodiments of the present invention utilize an existing capability of wireless base stations, its Uplink Diversity feature, to provide two separate and distinct composite RF input signals associated with each base station sector.

The embodiments of the present invention described herein provide additional features that enhance the cost-effectiveness, flexibility and system performance of conventional systems with multiple remote antenna units in comparison with conventional techniques and systems. Embodiments of the present invention are applicable to a variety of communications products including the Digital Access Unit (DAU) and Remote Radio Head Unit (RRU).

The present disclosure enables a DAS including one or more DAUs, optical fiber transport sub-systems, and one or more RRUs to be field reconfigurable. Additional description related to DAUs and RRUs is provided in U.S. patent application Ser. No. 12/767,669, entitled "Remotely Reconfigurable Power Amplifier System and Method," filed Apr. 26, 2010, U.S. patent application Ser. No. 13/211,236, U.S. patent application Ser. No. 13/211,243, and U.S. patent application Ser. No. 13/211,247, all of which are hereby incorporated by reference in their entirety for all purposes.

To achieve these objects, the present invention exploits the Software Configurable Radio subsystem embedded in the DAU and the Software Configurable Radio subsystem embedded in the RRU to route and switch data packets associated with a specific group of desired uplink RF signals such that the desired signals are combined and the composite uplink signal is routed to the correct uplink RF output port of the DAU. Since these Software Configurable Radio subsystems are able to be instantaneously and dynamically re-programmed to redirect a given set of data packets to a new destination within the DAS, the present invention is clearly more advantageous than any prior art fixed DAS architecture.

The present invention exploits the reconfigurability features of the RRU to route and switch a specific group of uplink data packets associated with a specific group of RRUs so they are directed to the appropriate DAU. These uplink data packets correspond to a particular uplink RF frequency band. The present invention also exploits the reconfigurability features of the DAU to route a specific group of uplink data packets associated with a specific group of RRUs, then performs appropriate signal processing and filtering functions and provides a combined RF signal representing the appropriate RRU data packets and in turn routes the combined RF signal to the appropriate RF uplink port of the DAU. As a result of applying the correct data packet routing and switching, signal processing and filtering, the uplink noise associated with a specific group of RRUs is significantly reduced [this section needs editing, based on the detailed description of invention].

An embodiment of the present invention utilizes one or more RRUs. The objective of the RRU is to (on the Downlink path) accept an optical serial data stream coming in via an optical fiber link, process it and convert it to RF signals, amplify those signals and deliver them to the antenna. The objective of the RRU is to (on the Uplink path) receive RF signals from the antenna(s), convert and process them into a serial data stream, and deliver the serial data stream to the DAU via the optical fiber link. An embodiment of the present invention utilizes one or more DAUs. The objective of the DAU is to (on the Downlink path) accept RF signals from base station sectors, convert and process the signals into a serial data stream, and deliver the serial data stratum to RRUs via optical fiber links. The objective of the DAU (on the Uplink path) is to receive optical serial data streams, process and convert those data streams to RF signals, and deliver the RF signals to specific base station sectors. The DAS comprised of one or more DAUs and multiple RRUs can be dynamically configured to reduce the uplink noise as voice and data traffic loading changes at the RRUs.

Applications of the present invention are suitable to be employed with DAS as well as other types of host or master units.

The present invention is also field upgradeable and/or remotely reconfigurable through a link such as an Ethernet connection to a remote operations and monitoring center. This feature adds to the present invention's flexibility and cost-effectiveness.

The present invention provides enhanced uplink system performance, however it does not require the use of multiple uplink antennas for a given frequency range at each RRU and does not have a negative impact on optical fiber link capacity and/or optical fiber link cost.

Numerous benefits are achieved by way of the present invention over conventional techniques. For example, embodiments of the present invention enhance system throughput and quality of service in comparison with conventional systems. Additionally, embodiments of the present invention reduce the system noise and enhance the system capacity. These and other embodiments of the invention along with many of its advantages and features are described in more detail in conjunction with the text below and attached figures.

BRIEF DESCRIPTION OF THE DRAWINGS

FIG. 1 shows two example architectures of a prior art DAS deployment, one architecture where the remote antenna units are configured for non-diversity and a second architecture where the remote antenna units are configured for a diversity implementation.

FIG. 2 is a block diagram showing a dual-band Remote Radio Head Unit (RRU) with a single combined uplink/downlink antenna port for each of the two frequency bands according to an embodiment of the present invention.

FIG. 3 is a block diagram showing a Digital Access Unit with four uplink RF output ports according to an embodiment of the present invention.

FIG. 4 is a system block diagram of a non-diversity DAS configured for reduced uplink noise, according to an embodiment of the present invention.

FIG. 5 is a system block diagram of a non-diversity DAS including a base station, eight RRUs, and two DAUs according to an embodiment of the present invention.

FIG. 5A is a system block diagram of a non-diversity DAS including two base stations, eight RRUs, and two DAUs according to an embodiment of the present invention.

FIG. 5B is a system block diagram of a non-diversity DAS including two base stations, eight RRUs, and two DAUs (with a Wired Ethernet link which networks the two DAUs) according to an embodiment of the present invention.

FIG. 5C is a system block diagram of a non-diversity DAS including two base stations, eight RRUs (where one of the RRUs is daisy-chained to one of the RRUs connected directly to a DAU via optical fiber, and where a second RRU is daisy-chained to a second one of the RRUs connected directly to a DAU via optical fiber), and two DAUs (with a Wired Ethernet link which networks the two DAUs) according to one embodiment of the present invention.

FIG. 5D is a system block diagram of a combined non-diversity and diversity DAS including two base stations, eight RRUs (where one of the RRUs is daisy-chained to one of the RRUs connected directly to a DAU via optical fiber, and where a second RRU is daisy-chained to a second one of the RRUs connected directly to a DAU via optical fiber), and two DAUs (with a Wired Ethernet link which networks the two DAUs), and where two of the eight total RRUs are equipped for uplink diversity, according to an embodiment of the present invention.

FIG. 5E is a system block diagram of a non-diversity DAS equipped for hybrid transport and including two base stations, eight RRUs, and two DAUs (with a Wired Ethernet link which networks the two DAUs), where four of the RRUs are fed via wired transport rather than by optical fiber, according to an embodiment of the present invention.

FIG. 5F is a system block diagram of a non-diversity DAS equipped for hybrid transport and including two base stations, eight RRUs, and two DAUs (with a Wired Ethernet link which networks the two DAUs), where three of the RRUs are fed via wired transport and where one of the RRUs is fed via wireless transport rather than by optical fiber, according to an embodiment of the present invention.

FIG. 6 illustrates an embodiment of the basic structure of the setup process and functions of the embedded software control modules that manage key functions of routing and switching the data packets controlling the uplink simulcast functions of a DAS, in accordance with an embodiment of the present invention.

FIG. 7 illustrates GUI setup screens for the process of routing and switching the data packets controlling the uplink simulcast functions of a DAS in accordance with an embodiment of the present invention.

FIG. 8 illustrates the RRU assignment process, for automatically assigning a group of RRUs to Uplink Port 1 of the DAU(s) and for assigning a group of RRUs to Uplink Port 2 of the DAU(s), and configuring routing and switching of the data packets controlling the uplink simulcast functions of a DAS, in accordance with an embodiment of the present invention.

DETAILED DESCRIPTION OF SPECIFIC EMBODIMENTS

A DAS may be configured to employ uplink diversity, where each remote antenna unit supports two uplink receive antennas. In such a case, two separate uplink signal paths are provided from each remote antenna unit to the host unit and onward to the base station uplink receive antenna ports. A DAS that has two receive antennas deployed at each remote antenna unit location may provide enhanced system performance. However, the additional physical space and costs associated with providing uplink diversity antennas and diversity signal processing at the remote antenna units may not be practical for some outdoor and indoor DAS deployments. Some DAS solutions require deployment of a separate optical fiber per remote antenna unit to support uplink diversity, which may further increase capital and operational costs. For some digital-over-fiber systems, the need to provide a second uplink path dramatically increases the required upstream data transport rate. The required upstream data transport rate for the desired uplink signals is twice as high as it would be without uplink path diversity. All these factors has resulted in a large percentage of existing commercially-deployed DAS networks not having uplink diversity antennas deployed at the remote antenna units.

Many of the radio base stations associated with DAS networks are equipped for uplink diversity. If the DAS itself is not configured to support uplink diversity, it would be highly desirable to somehow leverage this conventional base station function.

We can consider implementing a fixed arrangement of a DAS to take advantage of the two base station uplink input ports. This could be performed by manually configuring the optical fiber and RF cable connections within the DAS. This could be performed using various hardware connections such as RF cable arrangements which cannot be easily changed, and especially which cannot be easily changed without visiting the Base Station Hotel site each time a change is required. This approach would involve configuring the optical fiber and RF cable connections within the DAS so that approximately 50% of the remote antenna units' uplink signals are combined and the resulting combined signal is fed to uplink Port 1 of the base station. Similarly, the DAS could be manually configured so that the remaining (approximately 50%) remote antenna units' uplink signals are combined and the resulting combined signal is fed to uplink Port 2 of the base station. Although this approach would result in an uplink noise rise improvement as discussed previously due to combining the outputs of fewer remote antenna units into one base station uplink port, the DAS architecture cannot be easily changed nor frequently reconfigured as system loading and/or traffic changes occur (e.g., based on time of day) at the various remote antenna units. One such example is where a DAS remote antenna unit provides wireless coverage and/or capacity for an outdoor park venue. In such a case the voice and/or data traffic levels at the remote antenna unit are typically not very high, enabling the use of a high simulcast ratio for this and other adjacent or nearby remote antenna units associated with the DAS. However, on a different day and/or at a different time during a musical concert held at the park in the immediate vicinity of this example remote antenna unit, the wireless network operator may prefer to dedicate a single base station sector to this one particular remote antenna unit, for the duration of the concert. Once the concert has concluded a few hours later, the wireless network operator may want to return the DAS to the original Simulcast configuration. In such a case, a field engineer would need to visit the Base Station Hotel and host unit site each time any re-arrangement of the DAS is desired to manually change the system wiring connections to suit the operator's needs. For this reason, a fixed implementation like the one described here is undesirable and not cost-effective.

A first DAS architecture employing uplink diversity antennas at the remote antenna unit provides an uplink performance improvement, but may not represent a practical and/or cost-effective solution. A second DAS architecture employing a single receive antenna at the remote antenna unit, which in turn feeds a single uplink receive port at the base station has a high uplink noise addition factor, so uplink performance suffers. A third DAS architecture which employs multiple simulcast remote antenna units, each having a single receive antenna at the remote antenna unit, has a fixed combining arrangement where approximately half of the remote antenna units feed one uplink receive port at the base station and the remaining half of the remote antenna units feed the second uplink receive port at the base station can be considered. However, this architecture is difficult and costly to re-arrange in the event of the inevitable and potentially frequent changes in voice and data traffic loading which may occur at one or more of the remote antenna units.

The present invention generally relates to wireless communication systems employing Distributed Antenna Systems (DAS). A DAS typically includes one or more host units, optical fiber cable or other suitable transport infrastructure, and multiple remote antenna units. A radio base station is often employed at the host unit location, and the DAS provides a means for distribution of the base station's downlink and uplink signals among multiple remote antenna units. The DAS architecture can be either fixed or reconfigurable. Sometimes a bi-directional amplifier or RF repeater is used instead of an on-site base station to feed downlink over-the-air signals from a nearby base station to the DAS, and to feed uplink signals from the DAS over-the-air to a nearby base station.

A DAS effectively locates one or more wireless network coverage antennas physically close to wireless subscribers. The benefits of a DAS include reducing average downlink transmit power and reducing average uplink transmit power, as well as enhancing quality of service and data throughput.

More specifically, the present invention relates to a DAS for which the routing and splitting of downlink signals within the DAS and the routing and combining of uplink signals within the DAS is reconfigurable based on software configurable subsystems deployed at the host unit or host units and/or at the remote antenna units.

For a DAS, it may be advantageous to co-locate multiple radio base stations in a single location at or nearby the location of the DAS host unit. This is commonly known as a Base Station Hotel.

For the downlink path, the simulcast function of the DAS allows a single base station to share its radio resources among multiple remote antenna units. For a DAS which employs a large quantity of remote antenna units and employs a means for combining uplink signals from the remote antenna units, the process for signal combining is significantly affected by system noise addition. When the DAS combines the desired uplink signals collected from the multiple remote antenna units, it necessarily also combines noise from the multiple remote antenna units. The magnitude of the total system noise arising from the uplink combining process affects the wireless system performance, most notably uplink throughput and other quality of service parameters and effective coverage per remote antenna unit. Managing the overall uplink noise for a DAS involves making some critical system design and system architecture decisions, such that the deployed DAS meets its overall performance and cost objectives.

A simulcast arrangement for a DAS is where one host unit feeds downlink signals to N remote antenna units, and where N remote antenna units feed their respective uplink signals to the one host unit. In such a case, the DAS simulcast ratio can be referred to as N-to-1.

The total system noise on the uplink path resulting from the signal combining process consists of three main components. First, there is the system noise contribution due to the individual remote antenna noise figure and RF gain value. Next, there is the system noise contribution resulting from the combining process itself. This contribution varies depending on the actual combining means and combining algorithm. Various options are available for the combining means, such as combining at the host unit or combining at or near the remote antenna units. Some combining approaches are impacted by the optical fiber link (between host unit and remote antenna unit) itself. Also, there are multiple options for combining algorithms. A straightforward combining approach linearly combines signals and noise. A more advanced approach is where e.g., if an uplink signal level for a particular remote antenna unit at an instant of time is below a pre-determined threshold, both the signal and noise associated with that remote antenna unit are suppressed in the combining process so that they don't impact the total noise. This approach thereby provides a performance enhancement, compared with a conventional approach. Thirdly we have the system noise contribution which depends on the exact quantity of remote antenna units whose signals (and noise) are combined and fed to the base station. While the first two types of uplink noise contributions may be optimized to obtain the desired system performance, conventional DAS architectures do not provide any means for reducing the third type of noise contribution (due to the quantity of remote antenna units whose signals and noise are combined). In order to reduce this third type of noise contribution, the DAS architect simply employs fewer remote antenna units for a given simulcast configuration. This design tradeoff is frequently undesirable, since it can decrease the system's cost-effectiveness.

Based on the example provided previously where a DAS includes one host unit feeding N remote antenna units, we can consider a specific scenario where N=8. In this scenario, the host unit feeds the downlink signal to 8 separate remote antenna units. The 8 remote antenna units feed their uplink signals to the one host unit, where e.g., the 8 sets of signals (and noise) are combined linearly. The total noise addition factor (above a single remote antenna unit's uplink noise contribution) is 10 log N where N is quantity of remote antenna units which are simulcast on uplink (and downlink). For N=8, the value in dB corresponding to 10 log N is approximately 9 dB. Therefore the total noise addition factor for this scenario is 9 dB. Based on the behavior of the 10 log N value, the noise addition factor increases by 3 dB for each doubling of the quantity of simulcast remote antenna units. It can be seen that a 3 dB increase or decrease in the noise addition factor is quite significant in affecting system performance.

The present invention improves the data traffic throughput, quality of service, and overall DAS system noise figure by effectively reducing the quantity of remote antenna units whose uplink outputs are combined at the host unit and fed to the antenna port of the radio base station. By employing the present invention, a significant performance improvement can be obtained without any reduction in the quantity of deployed remote antenna units for the DAS.

According to an embodiment of the present invention, a novel Distributed Antenna System is provided that exploits the Software Configurable Radio subsystem (referred to herein as a software-defined digital platform) embedded in the DAU and the Software Configurable Radio subsystem (referred to herein as a software-defined digital platform) embedded in the RRU to route and switch data packets associated with a specific group of desired uplink RF signals such that the desired signals are combined and the composite uplink signal is routed to the correct uplink RF output port of the DAU.

FIG. 2 is a block diagram showing a Dual-band Remote Radio Head Unit with two combined downlink/uplink antenna ports, one for 850 MHz and one for 1900 MHz. Referring to FIG. 2, Fiber 1 connected to SFP1 201, is a high speed fiber cable that transports data between the (base station and) host unit location and the Remote Radio Head Unit. Fiber 2 is used to daisy chain other remote radio head units which are thereby interconnected to the base station or DAU. The software-defined digital platform 203 performs baseband signal processing, typically in an FPGA or equivalent. Building block 204 is a Serializer/Deserializer. The deserializer portion extracts the serial input bit stream from the optical fiber transceiver 201 and converts it into a parallel bit stream. The serializer portion performs the inverse operation for sending data from the Remote Radio Head Unit to the base station. In one embodiment, the two distinct bit streams communicate with the base stations using different optical wavelengths over one fiber, although multiple fibers can be used in alternative arrangements. The deframer 206 deciphers the structure of the incoming bit stream and sends the deframed data to the Crest Factor Reduction Algorithm 212. The Crest Factor Reduction block 212 reduces the Peak-to-Average Ratio of the incoming signal so as to improve the Power amplifier DC-to-RF conversion efficiency. The waveform is then presented to the Digital Predistorter block 211. The digital predistorter compensates for the nonlinearities of the Power Amplifier 226 in an adaptive feedback loop. The downlink RF signal from the Power Amplifier is fed to duplexer 228 and is then routed to the antenna port 231. Digital Upconverter 213 filters and digitally translates the deframed signal to an IF frequency. Element 219 is a digital to analog converter which feeds an IF signal into upconverter 223. The Framer 206 takes the data from the digital downconverter 215 and packs it into a Frame for transmission to the BTS via the optical fiber transceiver 201. Element 217 is an Analog to Digital converter that is used to translate the analog RF uplink signal into digital signals. The receiver comprises a downconverter 221 and an LNA 229.

The power amplifier has an output coupler for extracting a replica of the output signal in the feedback path. The feedback signal is frequency-translated by downconverter 222 to either an IF frequency or baseband and presented to an Analog to Digital converter 218. This feedback signal is used in an adaptive loop for performing Digital Predistortion to compensate for any nonlinearities created by the power amplifier. A switch 207 enables a single feedback processor and digital processor to support two frequency bands, 850 and 1900 MHz.

The Ethernet cable from CPU 210 is used to locally communicate with the Remote Radio Head Unit. DC power converters 208 and 209 are used to obtain the desired DC voltages for the Remote Radio Head Unit. Either an external voltage can be connected directly into the RRU or the DC power may be supplied through the Ethernet cable.

FIG. 3 is a block diagram showing a quad-band Digital Access Unit. The DAU has an RF base station interface (typically to four sectors). The DAU is equipped with four Tx/Rx RF ports, two for 850 MHz and two for 1900 MHz. The downlink functions have been disabled (note gray coloring of DNC2 310, ADC 314 and DNC3 311 and ADC 315) on one of the 850 MHz ports and on one of the 1900 MHz ports. Therefore there are four uplink RF output ports, two for 850 MHz and two for 1900 MHz. On the optical interface side, the DAU is connected to multiple RRUs in a start or star/daisy chain network, via six optical fiber interfaces.

Referring to FIG. 3, for one of the four downlink paths RF signals entering the DAU at duplex RF port 300 are separated from uplink signals by RF duplexer 305 and frequency-converted by downconverter 309, digitized by analog to digital converter 313, and converted to baseband by digital processing function 318 which is part of the FPGA 317. Data streams are then I/Q mapped and framed with monitoring and control signals in Framer/Deframer 322. Specific parallel data streams are then independently converted to serial data streams in SerDes 323 and translated to optical signals by pluggable SFP optical transceiver modules 324, and delivered to optical fibers 325. The six optical fibers deliver the serial optical data streams to multiple RRUs. The other three sets of downlink RF paths operate similarly.

Referring to FIG. 3, for the uplink path optical signals received from RRUs are de-serialized by SerDes 323, deframed by Framer/Deframer 322, and digitally up-converted by digital processing function 318. Data streams are then converted to analog IF by digital to analog converter 326 and up-converted by upconverter UPC1, then amplified by RF amplifier 330 and filtered by duplexer 305. The uplink RF signal enters the base station at Uplink RF Port 300. CPU 338 feeding Ethernet router 340 provides separate Ethernet ports 342 and 343 for different applications. DC/DC converter 341 allows the DAU to operate with a DC input voltage.

FIG. 4 is a system block diagram of a DAS configured for reduced uplink noise according to an embodiment of the present invention. The diagram shows a simplified Distributed Antenna System 400 including a diversity base station, one DAU with two uplink RF output ports, and two RRUs according to an embodiment of the present invention. Referring to FIG. 4, a Diversity base station 401 equipped with one Downlink RF port and two Uplink RF ports is employed to drive the non-Diversity DAS. DAU 402 serves as the host unit for the system and RRUs 403 and 404 serve as the two remote antenna units connected via optical fiber. Each RRU has one Downlink antenna port and one uplink antenna port. The system is able to provide a 3 dB uplink system noise improvement due to the fact that the uplink simulcast ratio (with regard to Uplink Port 1 or Uplink Port 2 of the DAU) is only 1:1. That is, only one uplink antenna feeds each port of the base station. If a conventional host unit were utilized with two remote antenna units, the simulcast ratio would be 2:1 with a 3 dB higher uplink noise level.

FIG. 5 is a system block diagram of a DAS configured for reduced uplink noise comprised of 8 total RRUs and two DAUs. Referring to FIG. 5, the diagram shows a Distributed Antenna System 500 including two DAUs which are networked with one another and 8 RRUs. A Diversity base station 501 equipped with one Downlink RF port and two Uplink RF ports is utilized in conjunction with the non-diversity DAS. In other embodiments, the base station is replaced in this illustration with a repeater unit that is coupled to a base station at a separate location.

DAUs 502 and 503 serve as the host unit for the system. DAU 502 is designated to be the Master DAU. RRUs 504, 505, 506, 507, 508, 509, 510 and 511 serve as the eight remote antenna units connected via optical fiber. Each RRU has one Downlink antenna port and one uplink antenna port. The system is able to provide a 3 dB uplink system noise improvement due to the fact that the uplink simulcast ratio (with regard to Uplink Port 1 or Uplink Port 2 of DAU 502 is only 4:1. If we were to employ a conventional host unit and 8 remote antenna units, the simulcast ratio would be 8:1 with a 3 dB higher uplink noise level. As explained previously, the total noise addition factor (above single RRU Uplink Noise Figure) is 10 log N where N is quantity of RRUs being Uplink simulcast per DAU port. Since N=4 for both Port 1 and Port 2, 10 log N is 6 dB. The 3 dB reduction in uplink noise rise is quite significant.

An alternative embodiment is one where the quantity of optical fibers directly connecting the DAU to multiple RRUs may be from 1 to 6, or even larger.

An alternative embodiment is one where the base station is a picocell base station equipped to support uplink diversity.

An alternative application for the architecture shown in FIG. 5 is where multiple DAUs are employed to provide a means of directly feeding a larger quantity of RRUs. An example of a relevant application is one where each RRU requires its own dedicated high capacity optical fiber link. In such a case, it may be desirable to provide interconnections among a larger quantity than 2 DAUs.

FIG. 5A is a system block diagram of a non-diversity DAS which is identical to FIG. 5, except that a second base station 512 is connected to DAU 503. Although the second base station 512 can operate on a different frequency range than the first base station 501, a useful application is one where the second base station 512 operates on the same frequency as the first base station 501. Once the fixed capacity of the first base station 501 is nearly fully utilized, the network may be remotely reconfigured so that a certain portion of the RRUs are fed by base station 501 (both uplink and downlink functions), while the remaining RRUs are fed by base station 512 (both uplink and downlink functions).

FIG. 5B is a system block diagram of a non-diversity DAS which is identical to FIG. 5A, except that a Wired Ethernet link (instead of an optical fiber link) is employed to network DAU 502 with DAU 503. The Wired Ethernet link facilitates communication of control information and packets representing uplink and downlink signals between DAU 502 and DAU 503. In other embodiments, combinations of optical fiber networking and wired Ethernet connections are utilized. One of ordinary skill in the art would recognize many variations, modifications, and alternatives.

FIG. 5C is a system block diagram of a non-diversity DAS which is identical to FIG. 5B, except that RRU 505 is daisy-chained to RRU 504, instead of having RRU 505 directly connected to DAU 502. Similarly, RRU 507 is daisy-chained to RRU 506, instead of having RRU 507 directly connected to DAU 502. This type of architecture which employs daisy-chaining may provide a more cost-effective implementation for certain applications.

FIG. 5D is identical to FIG. 5C, except that since RRU 508 and RRU 509 are both equipped for uplink diversity, the system block diagram shows a combined non-diversity and diversity DAS. In this DAS network configuration, the Uplink 1 signals from RRU 508 and RRU 509 are fed either to base station 501 Uplink 1 port or base station 502 Uplink 1 port and the Uplink 2 signals from RRU 508 and RRU 509 are fed either to base station 501 Uplink 2 port or base station 502 Uplink 2 port, as determined to be appropriate by the system software algorithms. Uplink signals from all the non-diversity RRUs are fed to base station 501 Uplink 1 port, base station 501 Uplink 2 port, base station 502 Uplink 1 port or base station 502 Uplink 2 port, as determined to be appropriate by the system software algorithms.

FIG. 5E is a system block diagram of a non-diversity DAS which is identical to FIG. 5C, except that RRUs 508, 509, 510 and 511 are fed via wired transport rather than by optical fiber. For some indoor applications, it may be more cost-effective to employ wired transport via copper CAT-5 or CAT-6 cable, rather than optical fiber. Although single-mode optical fiber provides higher digital transmission rates than copper (particularly for longer distances), the bandwidth for copper may be adequate for many applications such as indoor DAS.

FIG. 5F is a system block diagram of a non-diversity DAS which is identical to FIG. 5D, except that RRU 511 is fed via a wireless link 513, rather than by wired transport (or optical fiber). For some applications where it is more inconvenient and/or more costly to deploy wired transport or optical fiber, it may be more cost-effective to employ a wireless link.

FIG. 6 shows the basic structure of the setup process and functions of the embedded software control modules in the DAU and RRU which manage the key functions of routing and switching the data packets controlling the uplink simulcast functions.

Referring to FIG. 6, the DAU Embedded Software Control module 600 and RRU Embedded Software Control module 601 can be better understood in connection with the operation of key functions of the DAU and RRU. One such key function is amplifying uplink signals received at the RRU, converting the uplink signals to data packets, routing and processing the converted digital signals, and re-converting and routing specific RF signals to specific uplink output ports of the DAU. The DAU Embedded Software Control module comprises a DAU Memory and Database module 604 that stores a list of all the RRUs which are associated with a particular base station sector. These are also the same RRUs whose downlink signals are simulcast from a particular base station sector to a specific group of RRUs. The system configuration information is entered during the DAS commissioning process and stored. The DAU Embedded Software Control module also comprises a DAU Management Control module 602 which communicates with the RRU over a fiber optic link control channel via a control protocol with the RRU Management Control module 606. In turn, the RRU Management Control module sets the individual parameters of all the Digital Down-Converters in the RRU to enable or disable specific radio resources from being received and processed by a particular RRU or group of RRUs. The function of the DAU Scheduling module 603 is to facilitate changes of the DAS system configuration (e.g., list of simulcast RRUs) based on time-of-day and/or day of week as desired by the DAS operator. The function of the Remote Monitoring and Control capability of the DAU is to allow the desired system configuration information to be set by the DAS operator.

For neutral host applications where multiple wireless network operators share one DAU and/or share one or more RRUs, it is likely that a second and perhaps a third base station sector is feeding RF signals to/from some of the same RRUs. The system needs to be able to accommodate this important feature, which is facilitated by the software configurable radio architecture of the present invention.

Referring to FIG. 7, a GUI setup screen 700 is shown which enables the DAS operator to enter key parameters of the desired system configuration. The DAU unit name or label is entered at Field 707. The DAU frequency band information is entered at Field 701 (for the four different RF paths in the DAU). The Interface Type (S for Simplex or D for Duplex) is entered at Field 702. The base station sector information is entered at Field 703. The Interface Setup configuration information is entered at Field 704 (either Tx/Rx or Rx only) for each RF path. Field 705 is used to commit the entered values. Field 706 shows the settings which were made based on the automatic uplink RF port assignment algorithm to be described below.

In order to implement a key object of the present invention, the system must perform functions of parsing, switching and routing the data packets associated with uplink signals from e.g., half of the RRUs associated with (that is, simulcast from) RRUs corresponding to a single base station sector. The present invention implements an algorithm whereby the DAU's software configurable radio controller associated with each base station sector is set up to select 50% (or as close to 50% as possible) of the RRU uplink signal paths (and the data packets associated with those specific uplink signal paths). Once the selection is made, essentially 50% of the uplink paths (from the Non-Diversity RRUs) are automatically allocated to DAU Uplink Port(s) 1 and the remaining uplink paths from the remaining RRUs associated with that base station sector are automatically allocated to DAU Uplink Port(s) 2. The control algorithm employs an automated process to select the uplink RF paths which become associated with DAU Uplink Port 1. As long as the system Simulcast Configuration is not changed either manually by the wireless network operator or automatically by the DAU Scheduling module, the setting of the control algorithm remains fixed as well.

Referring to FIG. 8, the Non-Diversity RRU assignment process and its control algorithm are explained. The process begins at Step 800. Referring to Step 801, the DAS operator locally or remotely enters (or selects from among all the RRUs) a list of all the RRUs which are to be simulcast for each base station sector feeding the DAS (at the DAU). The RRU designations entered or selected may include Diversity RRUs and Non-Diversity RRUs. Each Non-Diversity RRU is assigned an alphanumeric string S1, S2, S3 etc. during the system commissioning process. The list of Non-Diversity and Diversity RRUs for each base station sector is stored in non-volatile memory in the DAU Memory and Database module and is available to the DAU Management Control module. Referring to Step 802, the DAU Management Control module computes the total (integer value) quantity R1, R2, R3, etc. of Non-Diversity RRUs to be simulcast and associated with that particular base station sector. Referring to Step 803, the control algorithm which is part of the DAU Management Control module calculates the decimal value Vn which is a predetermined percentage (e.g., 50%) of the total quantity of Non-Diversity RRUs associated with each base station sector (V1, V2, V3, etc.). The algorithm then employs a conventional decimal-to-integer conversion method to convert the value Vn to an integer value In. The conversion works as follows. If Vn is halfway between two whole numbers, the even number is returned; that is, 4.5 is converted to 4, and 5.5 is converted to 6. If Vn is less than halfway between the two whole numbers, the number closest to an integer is returned; that is, 4.4 is converted to 4 and 4.7 is converted to 5. The value of In is the quantity of Non-Diversity RRUs whose uplink outputs will be assigned to Uplink Port 1 of the associated base station sector. Referring to Step 804, the control algorithm calculates the value of (Rn−In), which is the quantity of RRUs whose uplink outputs will be assigned to Uplink Port 2 of the associated base station sector. Referring to Step 805, the algorithm determines which specific RRU uplink signals will be assigned to Uplink Port 1 of the associated base station sector. This determination is made as follows. Each of the list of Rn different RRUs is sorted by evaluating the alphanumeric designation assigned to that RRU at the time of commissioning. A conventional alphanumeric sorting algorithm such as e.g., one employed with commercially-available software like Microsoft Excel can be used. Reference: http://support.microsoft.com/kb/322067.

Referring to Step 806, after the list of Rn RRUs has been sorted, the first In RRUs are designated as being associated with Uplink Port 1 of the relevant base station sector. The remaining RRUs on the list are designated as associated with Uplink Port 2. Referring to Step 807, the assignment information is conveyed by the DAU Management Control module to the RRU Management Control module and onward to the key elements of the RRU to implement the algorithm-defined configuration. Referring to Step 808, the configuration is fully implemented within the system and in Step 809 is made dynamically operational. The settings result in the appropriate uplink signals being combined at Steps 810 and 811 for the associated DAU Uplink Ports 1 and 2, respectively.

The above process (per Steps 800-811) is automatically repeated within the system for each base station sector during the DAS commissioning process. In the event that the system Simulcast Configuration information is changed for any reason, the control algorithm will re-determine which 50% of the "new" uplink paths will be associated with DAU Uplink Port 1, and also which of the remaining "new" uplink paths will be allocated to DAU Uplink Port 2.

In summary, the Software Configurable Distributed Antenna System and Method for Reducing Uplink Noise provides enhanced uplink performance, increased throughput, better quality of service and reduced operational costs. The system is also reconfigurable and remotely field-programmable since the algorithms can be adjusted like software in the digital processor at any time.

Moreover, the system is flexible with regard to being able to support various technologies such as CDMA, TD-SCDMA, WCDMA, WiMAX, IEEE 802.11x and LTE. Although the term diversity has been used herein to refer to the base station which is employed in conjunction with the instant invention and although the term non-diversity has been used herein to refer to the type of RRU that is equipped with a single uplink antenna port, different terms are used to refer to embodiments used in conjunction with WiMAX and LTE systems and are included within the scope of the present invention. For example, for WiMAX and LTE systems, the terms Multiple Input Multiple Output (MIMO) and Single Input Single Output (SISO) can be utilized to describe the embodiments discussed in this specification. As an example, the same benefits including reduced uplink noise are obtained for WiMAX, IEEE 802.11x and LTE systems wherein a MIMO base station is used in conjunction with SISO RRUs. Thus, the term diversity used in relation to a base station can be replaced with MIMO and the term non-diversity used in relation to a remote unit can be replaced with SISO in other embodiments of the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

A glossary of terms follows:
ACLR Adjacent Channel Leakage Ratio
ACPR Adjacent Channel Power Ratio
ADC Analog to Digital Converter
AQDM Analog Quadrature Demodulator
AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator
LPF Low Pass Filter
MCPA Multi-Carrier Power Amplifier
MDS Multi-Directional Search
MIMO Multiple Inputs Multiple Outputs
OFDM Orthogonal Frequency Division Multiplexing
PA Power Amplifier
PAPR Peak-to-Average Power Ratio PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit
SAW Surface Acoustic Wave Filter
SISO Single Input Single Output
UMTS Universal Mobile Telecommunications System
UPC Up Converter
WCDMA Wideband Code Division Multiple Access
WLAN Wireless Local Area Network

What is claimed is:

1. A distributed antenna system including:
    a master unit including:
        a downlink RF input operable to receive an RF input signal from a downlink port of a base station;
        a first uplink RF port;
        a second uplink RF port;
        a first optical port; and
        a second optical port;
    a first remote unit coupled to the first optical port of the master unit, wherein the first remote unit comprises a downlink antenna port and a first uplink antenna port operable to receive a first RF uplink signal; and
    a second remote unit coupled to the second optical port of the master unit, wherein the second remote unit comprises a downlink antenna port and a second uplink antenna port operable to receive a second RF uplink signal;
    wherein the master unit is operable to:
        transmit a first RF signal associated with the first RF uplink signal to a first uplink port of the base station through the first uplink RF port; and
        transmit a second RF signal associated with the second RF uplink signal to a second uplink port of the base station through the second uplink RF port.

2. The distributed antenna system of claim 1 wherein the first remote unit comprises a non-diversity remote unit including a single uplink antenna port.

3. The distributed antenna system of claim 1 wherein the second remote unit comprises a non-diversity remote unit including a single uplink antenna port.

4. The distributed antenna system of claim 1 wherein the master unit comprises a digital access unit.

5. The distributed antenna system of claim 1 wherein the base station comprises a diversity base station.

6. The distributed antenna system of claim 1 wherein the base station comprises a repeater device.

7. The distributed antenna system of claim 1 wherein the first remote unit comprises a remote antenna unit.

8. The distributed antenna system of claim 1 wherein the first remote unit further comprises a second uplink antenna port.

9. The distributed antenna system of claim 8 the first remote unit comprises a diversity remote unit.

10. The distributed antenna system of claim 1 wherein the first remote unit is coupled to the first optical port of the master unit using a fiber optic connection.

11. A distributed antenna system comprising:
    a first master unit including:
        a downlink RF input operable to receive an RF input signal from a downlink port of a base station;
        a first uplink RF port;
        a second uplink RF port; and
        a first plurality of optical ports;
    a first plurality of remote units, each being coupled to one of the first plurality of optical ports via an optical fiber connection;
    a second master unit including a second plurality of optical ports; and
    a second plurality of remote units, each being coupled to one of the second plurality of optical ports via an optical fiber connection, wherein the second master unit is networked with the first master unit;
    wherein the first master unit is operable to:
        transmit a first RF signal associated with one or more RF uplink signals received by one or more of the first plurality of remote units to a first uplink port of the base station through the first uplink RF port; and
        transmit a second RF signal associated with one or more RF uplink signals received by one or more of the second plurality of remote units to a second uplink port of the base station through the second uplink RF port.

12. The distributed antenna system of claim 11 wherein the master unit comprises a controller.

13. The distributed antenna system of claim 11 wherein the second master unit is networked with the first master unit using one of the first plurality of optical ports and one of the second plurality of optical ports.

14. The distributed antenna system of claim 11 wherein the second master unit is networked with the first master unit using a wired Ethernet connection.

15. The distributed antenna system of claim 11 further wherein the second master unit is operable to:
    transmit a third RF signal associated with one or more RF uplink signals received by one or more of the second plurality of remote units to a first uplink port of a second base station;
    transmit a fourth RF signal associated with one or more RF uplink signals received by one or more of the second plurality of remote units to a second uplink port of the second base station.

16. The distributed antenna system of claim 11 wherein one of the first plurality of remote units is networked to another of the first plurality of remote units.

17. The distributed antenna system of claim 11 wherein one or more of the first plurality of remote units or one or more of the second plurality of remote units comprises a plurality of RF uplink ports.

* * * * *